Figure 1:
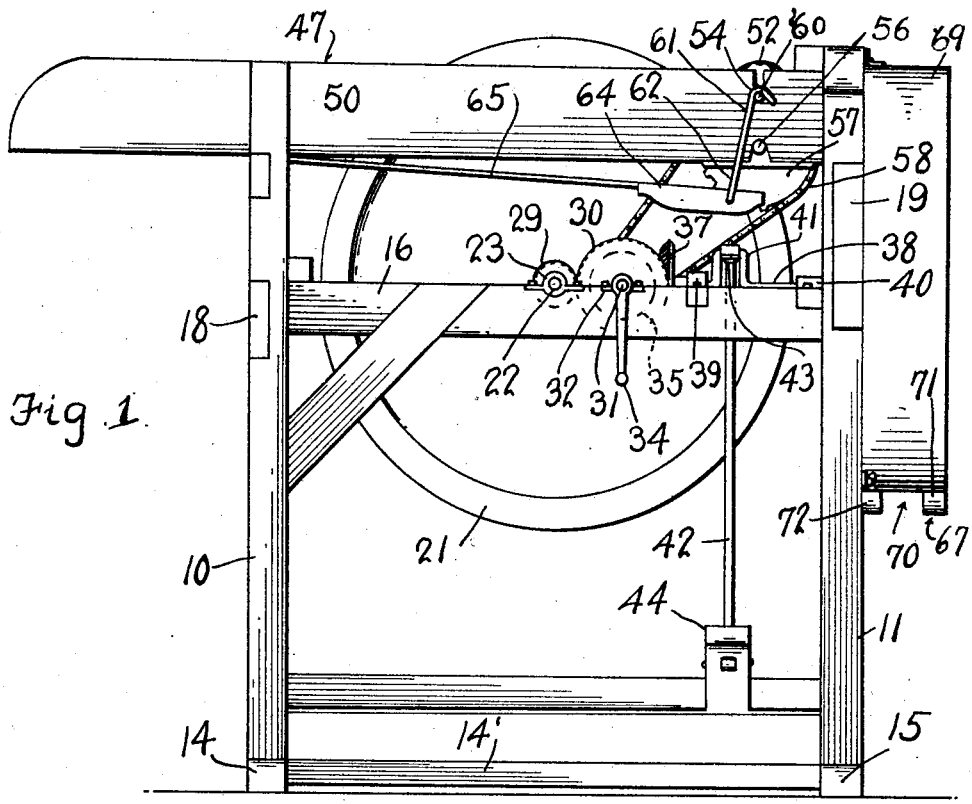

E. O. WILLIAMS.
FEED CUTTER.
APPLICATION FILED DEC. 10, 1918.

1,395,622.

Patented Nov. 1, 1921.
2 SHEETS—SHEET 1.

Witness
L. B. James

Inventor
E. O. Williams
By Victor J. Evans
Attorney

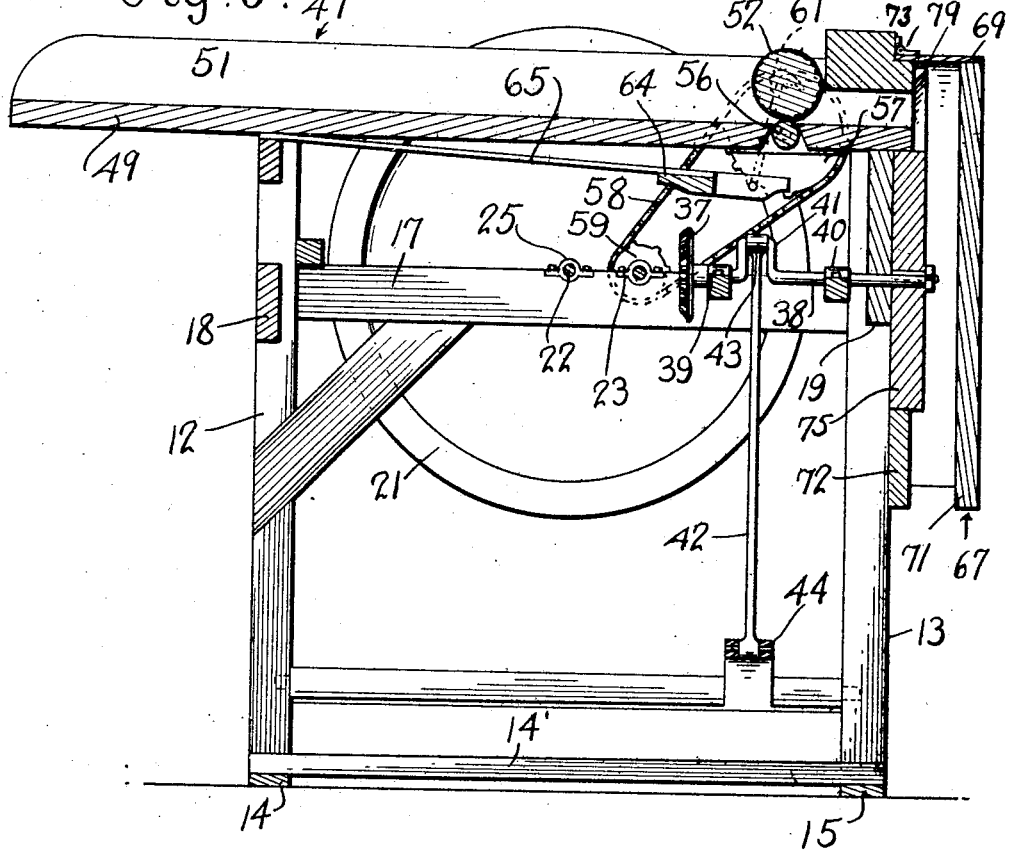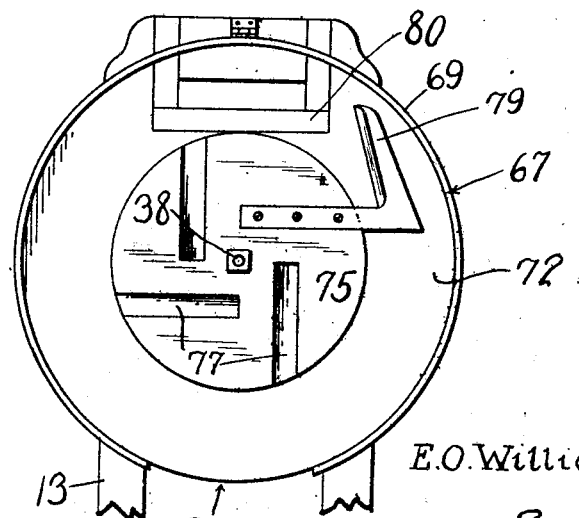

UNITED STATES PATENT OFFICE.

EMORY O. WILLIAMS, OF RED OAK, GEORGIA.

FEED-CUTTER.

1,395,622.　　Specification of Letters Patent.　　Patented Nov. 1, 1921.

Application filed December 10, 1918. Serial No. 266,076.

*To all whom it may concern:*

Be it known that I, EMORY O. WILLIAMS, citizen of the United States, residing at Red Oak, in the county of Campbell and State of Georgia, have invented new and useful Improvements in Feed-Cutters, of which the following is a specification.

This invention relates to a feed cutter, and the object is to provide for the direct application of power to the cutting mechanism, and for rendering the device operative by the use of a treadle, a crank to be operated by hand, or by employing outside power through the medium of a belt and pulley.

A further object is to provide certain novel feeding mechanism for controlling the product to be cut, and certain novel means for mounting the cutting devices.

With the foregoing and other objects in view, the invention consists in the novel combination and arrangement of elements hereinafter described and claimed.

Figure 2:
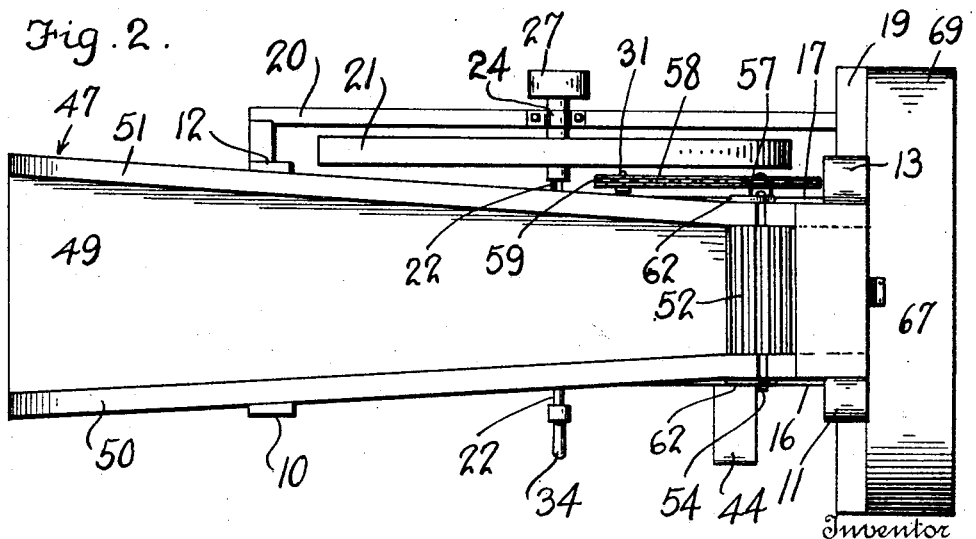

In the drawings,

Figure 1 is a view of the machine in side elevation, Fig. 2 is a top plan view, Fig. 3 is a vertical longitudinal section, and Fig. 4 is a detail view of the cutting device.

In carrying out my invention I provide a plurality of uprights 10, 11, 12 and 13 constituting a portion of the main frame, these elements being connected by lower transverse members 14 and 15, and the latter being connected by a bar 14 extending longitudinally.

The upper portion of the frame includes two longitudinal bars 16 and 17, transverse bars 18 and 19, and suitable bracing elements. An additional longitudinal bar 20 is mounted at one side of the frame, and between the bars 20 and 19 I mount a large balance wheel 21 on a shaft 22 supported in bearings 23 and 24, an additional bearing 25 being located in an intermediate position.

The outer end of shaft 22 carries a pulley 27 adapted to be driven from any suitable source of power. A small gear wheel 29 on shaft 22 meshes with larger gear wheel 30 on shaft 31, the latter being mounted in bearings 32, 33, and carrying a crank 34 at one end, permitting of hand operation.

Gear wheel 30 has two series of teeth, one series, 35 meshing with the teeth of beveled gear wheel 37 on crank shaft 38, mounted longitudinally with reference to the frame and operating in bearings 39, 40. Shaft 38 drives the cutting device and the crank portion 41 has connection with a pitman 42 which is detachable at 43 when the treadle is not to be used, that is, when the device is to be operated by hand or is to be driven by outside power. Pitman 42 is connected with treadle 44, suitably mounted. In this instance the treadle is rigid with reference to rotatable shaft 45, the latter being in reality a rock shaft.

A feed trough is designated 47 and includes bottom wall 49 and sides 50, 51, the latter being provided with bearings for a feed roller 52, channeled or corrugated longitudinally and mounted on shaft 54. This roller coöperates with a smaller roller 56 driven from a sprocket wheel 57 and a chain 58 engaging a sprocket wheel 59 on shaft 31.

Roller 52 is drawn downwardly because of the engagement of shaft 60 by the hook portions 61 of a bail member 62 mounted transversely of a small frame 64 carried by a resilient bar 65. This provides the required flexibility so far as the feed rollers and especially the upper roller is concerned. Both rollers may be corrugated. It will be understood that the bearings for the upper roller permit of vertical movement.

The cutting device is inclosed within a casing 67, the side walls of which may be substantially circular and connected by a circumferential band 69, the ends of which are spaced to provide a lower discharge opening 70. The lower portion of the casing including one wall 71 and the band 69, may be swung outwardly with reference to the other wall 72, a hinge connection being provided at 73. This permits of access to the interior.

The cutting device includes a disk member 75 mounted on shaft 38, driven as previously described. A plurality of channels 77 on the face of the disk receive the right-angled shank portions of knives 79. The blades are readily detachable for sharpening purposes, and they travel in a path adjacent to the end portion of the feed trough, the blades coöperating with stationary blades or metallic plates 80, affording a positive and direct cut. The length of the material being cut may be varied as desired. The blades being formed as shown, the cutting edge extends approximately tangentially with reference to the disk 75, or the edge of the latter, the opening between the outer end of each blade and the edge of the disk being substantially V-shaped, so that the material is retained while being cut and the blade is given a particularly effective stroke with reference to the material.

It will be observed that I have applied the power with but little intermediate gearing, and if the treadle is used the power is exerted directly on the main shaft; the cutting mechanism is especially effective, as is also the control of the feed rollers.

What is claimed is—

In a device of the class described, a main frame, a feed trough mounted therein, a cutting device including a rotary element, blades extending approximately tangentially from the periphery of the rotary element and intersecting the path of travel of the material to be cut, at the point of discharge thereof from the trough, one flat side of the blades moving in approximate contact with the end and sides of the trough, said blades embracing the material to be cut in a V-shaped opening between the individual blades and the lower end portion of the trough acting as a holding device.

In testimony whereof I affix my signature.

EMORY O. WILLIAMS.